United States Patent [19]

Backward

[11] 4,023,309
[45] May 17, 1977

[54] REAR QUARTER WINDOW LOUVER PANEL

[76] Inventor: Lennie E. Backward, 7626 Callaghan Road, Apt. 2616, San Antonio, Tex. 78229

[22] Filed: Sept. 15, 1975

[21] Appl. No.: 613,071

[52] U.S. Cl. .................................. 49/62; 49/65; 296/97 A

[51] Int. Cl.² ........................................ E05B 65/04

[58] Field of Search ............. 49/50, 51, 56, 57, 62, 49/64, 65, 67; 52/473, 507; 296/97 A, 97 F, 152; 292/256.73; 180/54 A

[56] References Cited

UNITED STATES PATENTS

| 228,784 | 6/1880 | Seaver | 52/473 X |
|---|---|---|---|
| 752,348 | 2/1904 | Lutts | 52/473 X |
| 1,419,321 | 6/1922 | Smith | 296/97 F |
| 1,419,322 | 6/1922 | Smith | 296/97 F |
| 1,779,062 | 10/1930 | D'Alfonso | 49/62 X |
| 2,139,156 | 12/1938 | Gill | 49/57 X |
| 2,366,224 | 1/1945 | Warp | 296/97 F UX |
| 2,492,909 | 12/1949 | Warp | 296/97 F UX |
| 2,603,822 | 7/1952 | Evans | 49/67 UX |
| 2,917,111 | 12/1959 | Clarke | 296/97 F UX |

FOREIGN PATENTS OR APPLICATIONS

| 523,927 | 4/1955 | Italy | 296/97 F |
|---|---|---|---|
| 1,321,311 | 6/1973 | United Kingdom | 52/473 |

Primary Examiner—William H. Schultz
Attorney, Agent, or Firm—Williard J. Hodges, Jr.

[57] ABSTRACT

A louver panel covering a rear quarter window for automobiles. The louver panel incorporates a frame secured to the window by means of a hinge at the leading edge and the securing plate at the trailing edge. To the frame are secured a multiplicity of louver strips projecting outward from the window at an angle of approximately 45°.

5 Claims, 7 Drawing Figures

REAR QUARTER WINDOW LOUVER PANEL

BACKGROUND OF THE INVENTION

1. Field of the Invention

This invention pertains to a louver panel for screening the rear quarter window of a two-door automobile. The device may be secured to a fixed window or window that pivots out. The purpose of the device is esthetic appeal and to screen the passengers from direct view and direct rays of the sun.

2. Description of the Prior Art

Louvers have been adapted and applied to rear windows of sporty-type automobiles. Sun screens in the nature of expanded metal sheets of light alloy such as aluminum are known. Certain curtains are used on vans, campers, and station wagons. Some of the prior art applicable to motor vehicles are the subject of U.S. patents such as those to Tonnon, U.S. Pat. No. 3,126,052, and Fester, U.S. Pat. No. 3,422,876. The art is highly developed as to building construction such as U.S. patent to Tarnoff, U.S. Pat. No. 3,422,744, and Williamson, U.S. Pat. No. 3,791,280.

SUMMARY OF THE INVENTION

The application of a louver panel to the rear quarter window of late model automobiles presents problems of proper design as to visibility by the driver of the vehicle and unusual problems of attaching the device to the rear quarter window. In the solving of the foregoing problems this invention resides.

The invention comprises two similar designs, the first consisting of a center frame to which is secured a series of louver strips uniformly spaced from the leading edge to the trailing edge. At the leading edge is secured a hinge and at the trailing edge a securing plate. The louver panel of this invention is secured to the rear quarter window with a securing adhesive or the window may be drilled and the device attached using bolts, nuts, and a resilient washer or bushings. Another species of the device utilizes a peripheral frame to which the individual louvers are attached with louver frame farings. This species of the design has a sweeping, flowing appearance. Either species is secured to the rear quarter window in a similar manner and serves substantially an identical purpose.

For a description of the construction of the preferred embodiment your attention is invited to the attached drawings wherein identical reference numerals refer to identical or equivalent components throughout the several views and the following description of the preferred embodiment.

DESCRIPTION OF THE PREFERRED EMBODIMENT

Figure 1:
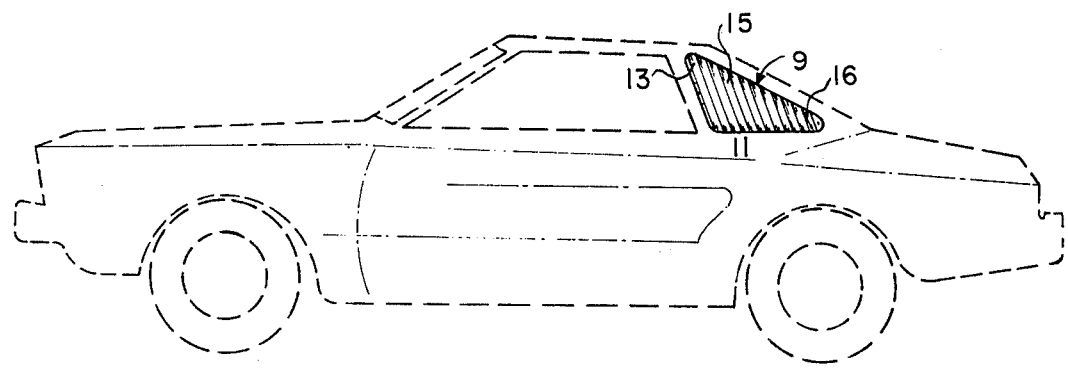
FIG. 1 is a plan view of an automobile with a louver panel attached to the rear quarter window.
Figure 2:
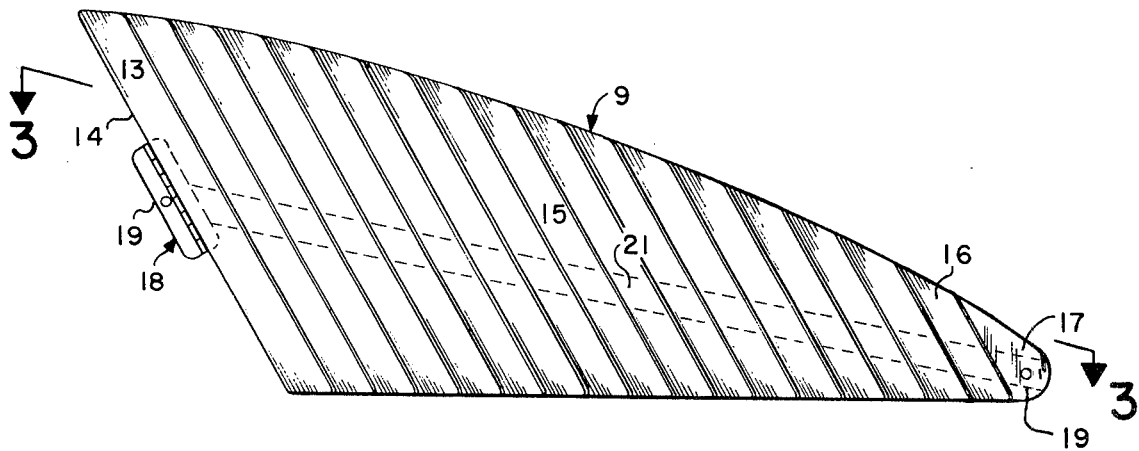
FIG. 2 is an outside plan view of species A of the invention.
Figure 3:
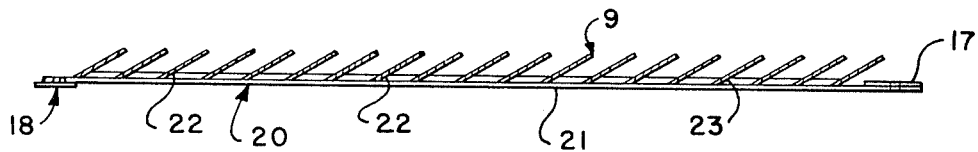
FIG. 3 is a top view of the device taken substantially on line 3—3 of FIG. 2 looking in the direction of the arrows.
Figure 4:
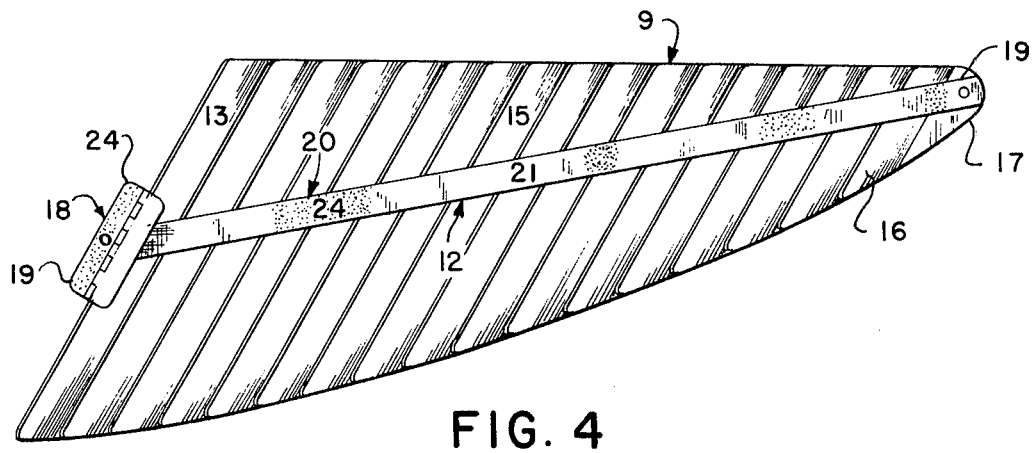
FIG. 4 is an inside plan view of the device being substantially the reverse of FIG. 2.

For a description of the construction of the preferred embodiment and its utilization reference is made to the foregoing referred to figures. For a description of species A of the invention reference is particularly invited in FIGS. 1–4. The rear quarter window louver panel 9 is designed for attaching to the rear quarter window 10 of car body 11 of automobiles having a general characteristic of a two-door coupe or sedan incorporating a sloping roof line frequently referred to as hard tops. Although the dimensions may vary the louver frame 12 of the preferred embodiment was 29 inches long. The leading louver strip 13 was constructed of a sheet of aluminum 1½ inches wide and 14 inches long. The stock employed was approximately 1/16 inch thick. It should be understood, howevr, that plastics, hard rubber or other metals can well be employed in the construction of the various components of rear quarter window louver panel 9 of this invention.

Leading louver strip 13 is secured adjacent the leading edge 14 of the louver frame 12. Intermediate louver strip 15 positioned at the mid-point of the rear quarter window louver panel 9 employed the same previously referred to louver stock and was approximately 9½ inches long. The trailing louver strip 16 was only 2½ inches long and was secured to the trailing edge 17 of louver frame 12. At the leading edge 14 of the device was secured a hinge 18 which was 1¼ inches long and 4 inches wide pivoted in the conventional manner at its center. Adjacent the trailing edge 17 was attached a securing plate 19 which was 1 inch wide and 1¼ inches long. The plate was constructed of 1/16 inch aluminum stock to provide rigidity. Projecting from the center of leading edge 14 to trailing edge 17 was a central frame member 20 1⅛ inches wide and 29 inches long. Projecting toward the louver side of the central frame 20 and projecting outward from the central frame 20 was a center frame rib 21¼ inches deep and ¼ inch wide at its outer edge. A series of louver notches 22 were cut in the center frame rib 21 beginning approximately at the trailing edge of the leading louver strip 13. These louver notches 23 began at approximately each 1⅝ inches and extended for a length of approximately ½ inch. This structure of center frame 20, center frame rib 21, and louver notches 22 permit the attaching of the progressive series of louvers beginning with the leading louver strip 13 progressing to the intermediate louver strip 13 and extending to the trailing louver strip 16. A total of 17 louver strips were interspersed on the device projecting outward from the center frame 20 at an angle of approximately 48° and were secured in the louver notches 22 by a series of louver welds 23.

The device of this invention may be secured to the rear quarter window 10 employing various conventional securing methods. Bolts or any number of aecuring adhesives 24 might be employed for attaching the hinge 18 and securing plate 19 the rear quarter window 10. The configuration of species A of the device just described in detail lends itself particularly well to employing securing adhesive 24 for attaching the center frame 21 directly to the rear quarter window 10. If it is desired, however, to secure the rear quarter window louver panel 9 to the rear quarter window 10 in a tiltable or removable configuration facilitating washing of the rear quarter window 10 the device may be secured to rear quarter window 10 utilizing a hinge bolt 25 in conjunction with a hinge nut 26 for attaching hinge 18 to the rear quarter window 10. If mechanical attachments are desired in lieu of securing adhesives 24 the rear quarter window 10 may be drilled and hinge resilient washer 27 positioned in the hole in the rear quarter window 10 and hinge bolt 25 in conjunction with the hinge nut 26 employed in conjunction with the resilient washer 27. In a similar fashion the trailing edge 17 may be attached employing a securing plate bolt 28 and a securing plate bolt nut 29 projecting through hole in the rear quarter window 10 adjacent the trailing edge 17 of the device. It is preferable to employ resilient securing plate washer 30 in the hole in the rear quarter window 10. The securing holes in the rear quarter window 10 may be drilled with glass drills readily available on the commerical market at the present time. In the preferred embodiment these holes were ⅜ inch in diameter. For a detailed description your attention is particularly invited in FIG. 2 wherein widow forward hole 31 and window rear hole 32 are illustrated in their relative positions in the glass and reference to the rear quarter window louver panel 9.

Figure 5:
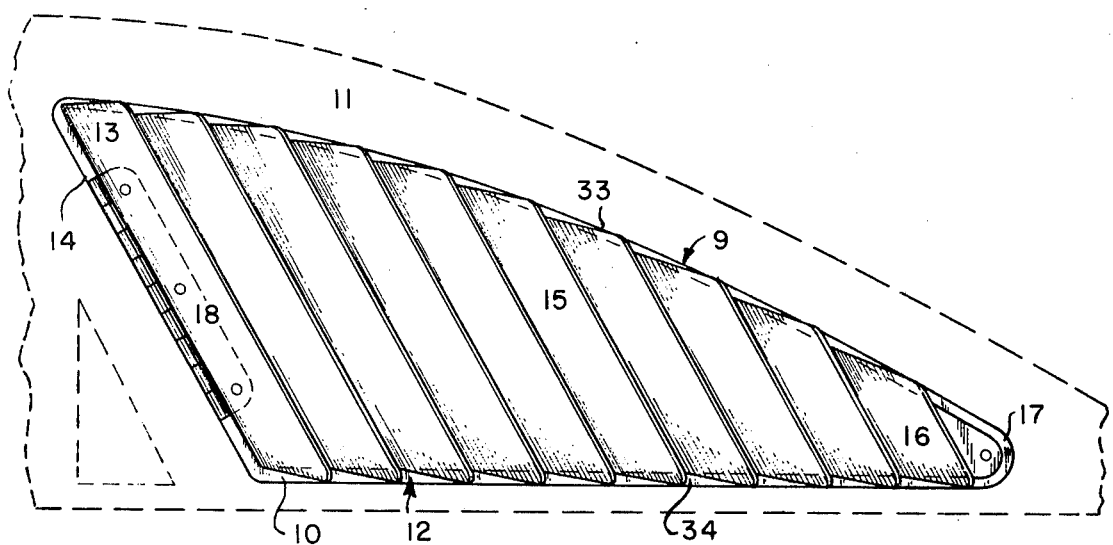
FIG. 5 is a fragmented view of an autombile illustrating species B of the device secured in a rear quarter window.
Figure 6:
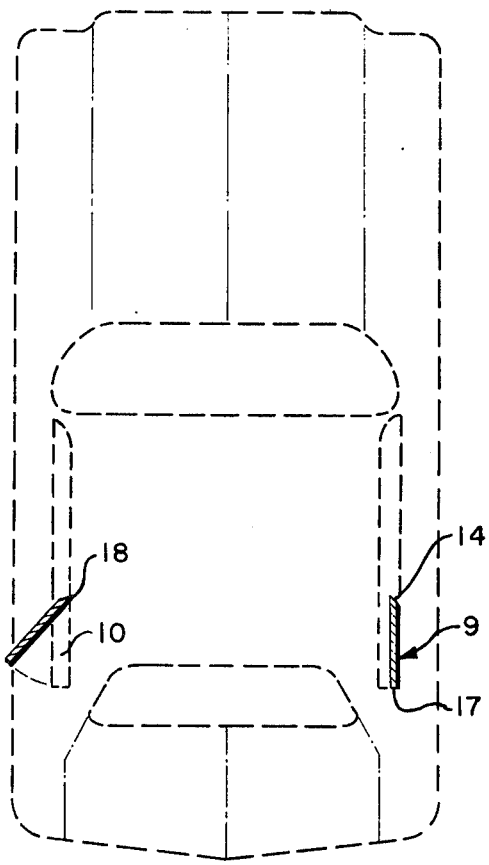
FIG. 6 is a top plan view of an automobile with the devices attached to the rear quarter window.
Figure 7:
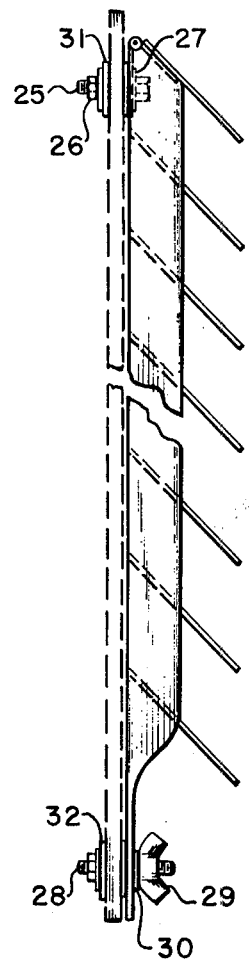
FIG. 7 is a detailed top view of species B of the device partially fragmented.

For a detail of the construction of species B of the invention reference to particularly made to the illustration contained in FIGS. 5-7 of the drawings. This species of the invention does not employ a central frame 20, but in lieu thereof utilizes a peripheral frame 33 within which is spaced a similar series of louver strips as previously described progressing from a leading louver strip 13 and intermediate louver strip 15 to a trailing louver strip 16 with the progressive series of louvers being secured equally spaced within the peripheral frame 33 and projecting at the previously described approximately 45° angle from the window side of the louver frame 12 outward from the rear quarter window 10. In this species of the construction of the device the various louver strips progressing from leading louver strip 13 through intermediate louver strip 15 to the trailing louver strip 16 are secured inside the peripheral frame 33 by welding or built-up louver frame securing farings 34. In this configuration of the rear quarter window louver panel 9 employing peripheral frame 33 the preferably method for securing to the rear quarter window 10 would employ hinge bolts 25, hinge nuts 26, and hinge resilient washer 27. The trailing edge may be attached to the rear quarter window 10 also employing securing plate belt nut 29, securing plate washer 30. The advantage of employing bolt and nut means for attaching the rear quarter window louver panel 9 to the rear quarter 10 is that this attachment may be tilted or removed for access to the rear quarter window 10 for cleaning.

Either species of this invention might be constructed employing suitable aluminum alloy stock materials and welding techniques utilized employed any of a number of suitable welding methods to guard against oxidation of the weld. Heliarc might be employed or various welding fluxes or compounds which shield the area against oxidation would be satisfactory. The devices of this invention also lend themselves to construction by various molding methods for plastics. Injection molding may be utilized. Such a method of molding would be particularly suitable for the construction of the device referred to in the disclosure as species B as particularly illustrated in FIGS. 5-7. The gist of this invention is not particular in the method of construction, but resides in the two embodiments illustrated and described. The various components of this invention and their various arrangements in the combined structure is the desired invention described and claimed.

OPERATION OF THE DEVICE

For an illustration of the operation and utilization of the device reference is particularly made to FIGS. 1, 5-7. Irrespective of the manner in which the invention is secured to the rear quarter window 10 hinge 18 and securing plate 19 might be attached to the rear quarter window 10 employing securing adhesives 24 or hinge bolt 25 in combination with hinge nut 26 and resilient washer 27 might be attached to the rear quarter window 10. Window forward hole 31 may be used in conjunction with the hinge 18 and a window rear hole 32 may be used in conjunction with securing plate 19. In this configuration, of course, securing plate bolt 28 and securing plate bolt nut 29 and securing plate washer 30 would be utilized. In this configuration of the device the rear quarter window louver panel 9 rests adjacent the rear quarter window 10. The devices are attached to the rear quarter windows 10 employing a removable securing plate bolt nut 29. These nuts may be removed and rear quarter window louver panel 9 tilted out, as illustrated in FIG. 6, for washing the rear quarter window 10 or louver panel 9. After the cleaning operation the securing bolt nuts 29 are reattached securing the louver panel 9 adjacent the window 10. The device in this position permits visibility by the driver through rear quarter window 10 and the rear quarter window louver panel 9. Sun and view from adjacent vehicles or pedestrians are restricted at an angle more advanced than 45° from the trailing edge 17 as we move forward toward leading edge 14. This screening effect is perhaps best illustrated in FIGS. 1 and 5.

Having described the construction of this invention in detail in two embodiments, what is desired to be claimed is all modification of the device not departing from the scope of equivalents as defined in the appended claims.

I claim:

1. A rear quarter window louver panel for automobiles comprising:
  a. a substantially rigid louver frame extending from a leading edge to a trailing edge projecting along an axis,
  b. a multiplicity of substantially evenly spaced louvers secured to said frame, said louvers projecting at an angle of approximately 45° outward from the axis from the trailing edge,
  c. said louvers having a uniform width and varying length, said louvers being secured to said frame in a uniform manner progressively decreasing in length from the leading edge to the trailing edge.
  d. attaching means for securing said rear quarter window louver panel to the rear quarter window of an automobile, comprising:
    1. a hinge secured to said frame adjacent said leading edge of said frame,
    2. a securing plate secured to said frame adjacent said trailing edge,
    3. a securing plate bolt projecting through said securing plate,
    4. a resilient securing plate washer positioned on said bolt, and
    5. a removable securing plate bolt nut positioned on said securing plate bolt, said combination being so constructed and arranged to permit said rear quarter window louver panel to tilt away from a window to which said louver panel is attached when said securing plate nut is removed.

2. The invention of claim 1 further comprising:
a. a hinge bolt projecting through said hinge, and
b. a hinge resilient washer positioned on said bolt, and
c. a hinge nut securing said hinge on said hinge bolt.

3. The invention of claim 1 wherein said louver frame comprises a center frame projecting on said axis from the said leading edge to the said trailing edge.

4. The invention of claim 1 wherein said louver frame comprises a peripheral frame surrounding and secured to said louvers.

5. The invention of claim 4 including louver frame securing farings attaching said louvers to said peripheral frame.

* * * * *